May 4, 1948.　　　　F. P. BOWER　　　　2,440,928
SPRING BIASED PARKING BRAKE LEVER
Filed Aug. 8, 1947　　　2 Sheets-Sheet 1

Frank P. Bower,
INVENTOR.

BY William J. Wesseler.
ATTORNEY.

May 4, 1948. F. P. BOWER 2,440,928
SPRING BIASED PARKING BRAKE LEVER
Filed Aug. 8, 1947 2 Sheets-Sheet 2

Frank P. Bower,
INVENTOR.

BY William J. Wesseler,
ATTORNEY.

Patented May 4, 1948

2,440,928

UNITED STATES PATENT OFFICE 2,440,928

SPRING BIASED PARKING BRAKE LEVER

Frank P. Bower, New Castle, Pa., assignor of one-half to T. E. Chambers, New Castle, Pa.

Application August 8, 1947, Serial No. 767,434

10 Claims. (Cl. 188—167)

This invention relates to a parking brake mechanism for automobiles and the like. More particularly, it comprises a parking brake lever of conventional form, provided with an auxiliary booster attachment, brought into active operation to move the lever to brake-setting position after the initial movement of such lever. It includes the provision of a pair of coiled springs connected with the lever and having a shifting or floating spring anchorage on the lever supporting means, whereby the springs are brought into brake-applying relation to the lever, after the initial movement of the lever to brake-setting position.

The invention also includes means for positively moving the floating anchorage for the springs when the brake lever is moved toward the brake-setting position, and also includes means for latching the lever in both the set and releasing positions.

The principal object of the present invention is to provide a means for supplying auxiliary power for moving the parking brake mechanism to brake applying position.

Another object of the invention is to provide a parking brake lever with spring connections operative to hold the lever normally in brake-releasing position and subject to automatic movement to hold the brake in brake-applying position.

Another object of the invention is to provide a safety means for attachment to the parking brake mechanism of an automobile which will assist or reinforce the manual means for setting the parking brake, and which will exert sufficient force to maintain the parking brake mechanism in set or holding position independently of the lever latching means.

Another object of the invention is to provide a parking brake mechanism of simple construction and easy of installation and maintenance which will assist in moving the parking brake lever to brake-setting position after the initial movement of the brake lever.

Other and further objects of the invention will appear in the course of the following description.

To the accomplishment of the foregoing and related ends, said invention, then, consists of the means hereinafter fully described and particularly pointed out in the claims, the annexed drawings, and the following description setting forth in detail certain mechanism embodying the invention, such disclosed means constituting, however, but several of various forms in which the principle of the invention may be used.

Figure 1:
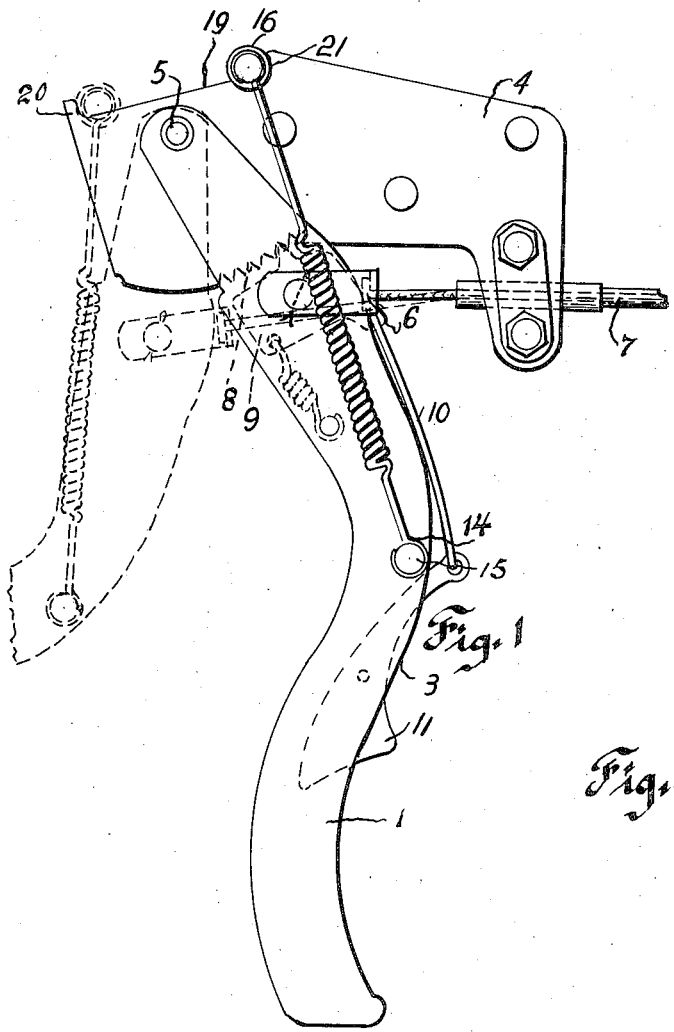
Fig. 1 is a side elevation of a parking brake lever and its supporting bracket, showing auxiliary spring lever operating means embodying the principle of the invention.

As is clearly shown in Fig. 1, the parking brake lever 1, is formed of a pair of spaced plates 2—3, which may comprise a single plate folded to provide a double plate over the greater portion of its extent with the upper end portions turned inwardly to snugly fit against the opposite sides of the supporting plate or bracket 4, which is firmly secured in a vertical position beneath the instrument panel board of an automobile or other structure in which a lever system of this character is to be used.

The brake lever 1 is mounted on a pivot pin 5 at its upper end, secured to the supporting plate 4, and at a point somewhat below the lower edge of the supporting plate the lever is provided with a cable terminal member 6, connected with the cable 7, which is connected with the brake band of the parking brake mechanism (not shown).

Figure 3:
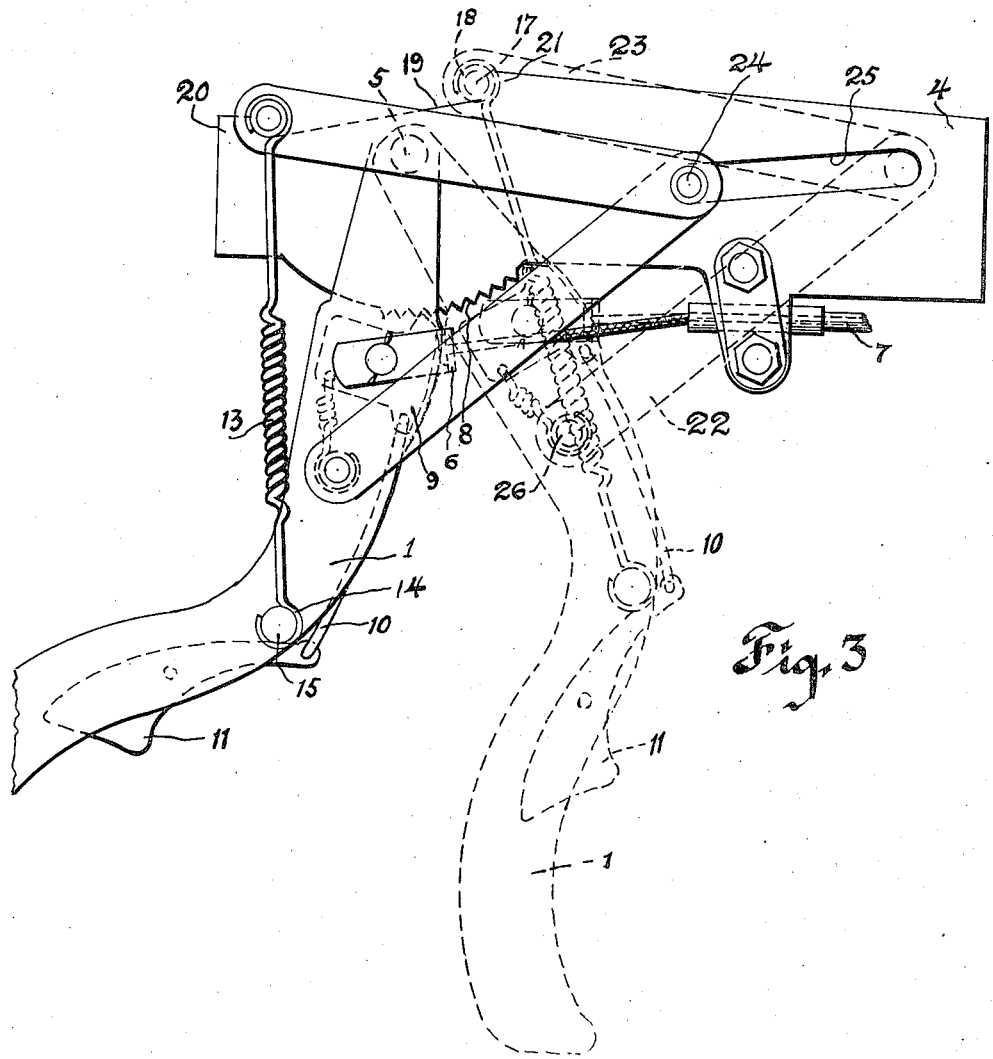
Fig. 3 is a side elevation of a modified form of parking brake mechanism embodying the principle of the invention.

An arcuate rack member 8 is provided on the lower edge of the supporting plate 4, as is shown more particularly in Fig. 3, which rack is engaged by a pawl 9, which is operable by means of a link 10, and lever 11, pivotally mounted on the lower end of the brake lever 1.

Figure 2:
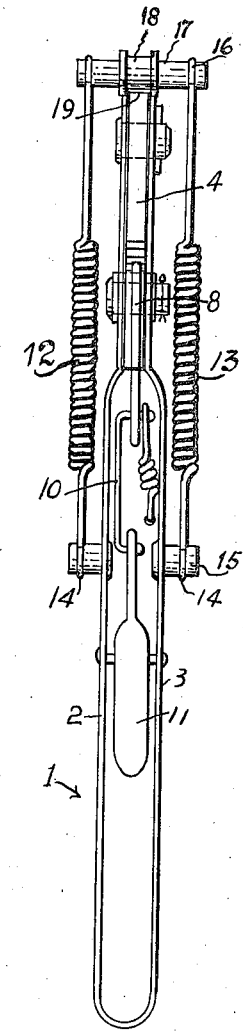
Fig. 2 is an end elevation of the structure shown in Fig. 1, as seen from the left-hand side of Fig. 1.

The brake lever 1 is provided with a pair of coiled springs 12—13 of sufficient size and weight to provide adequate force to hold the brake lever in applied position irrespective of whether the lever is locked by means of the pawl and ratchet mechanism referred to. As is shown in Fig. 2, the springs have hooks or eyes 14 at their lower ends which engage over grooved studs or pins 15, positioned on opposite sides of the brake lever at a point approximately midway of its length.

At their upper ends the springs are provided with eyes or loops 16 which are engaged in grooves provided near the ends of a short shaft 17, centrally of which is mounted a flanged roller 18, adapted to roll upon a short trackway 19, formed on the rearward end of the top edge of the supporting plate 4, and preferably disposed parallel to the imaginary chord of the arcuate rack member 8.

The trackway 19, as shown in Fig. 1, is inclined downwardly and is formed with an upstanding limit stop or abutment 20 at its extreme lower end, and with a similar limit stop or abutment 21 at its upper end against which the roller will normally rest when the parking brake lever 1 is in its released position and the springs 12—13 function to apply light resilient pressure to hold the lever in such position.

From the construction just explained it will be clear that as the parking brake lever is manually moved to brake-applying position the lower ends of the coiled springs 12—13 will be moved in a direction to pull the roller 18 downwardly along the inclined trackway 19 and thereby move the upper ends of the springs outwardly until the roller comes in contact with the abutment 20, and the springs will then apply power in a direction to hold the lever in brake-setting position; thus the initial movement of the lever serves to move the springs from a position at one side of the pivot of the brake lever to the opposite side thereof, in which latter position the springs assist the operator in moving the brake to brake-applying position, and thereafter the springs maintain the lever in brake-applying position, irrespective of whether the pawl and ratchet mechanism is securely engaged to hold the lever.

The movement of the roller 18 along the trackway 19 just described takes place very quickly as a "snap-action" after the initial movement of the brake lever in the brake-applying direction. Such action depends upon the relative position of the upper and lower ends of the springs 12—13 and is not a positive movement of the roller brought about by the action of the brake lever.

In order to provide positive movement of the shifting or floating upper ends of the springs 12—13 the modified form of mechanism shown in Fig. 3 is provided.

In the modified form of construction, a pair of links 22—23 is provided, connected to each other by means of a roller 24, riding in a slotted trackway 25 formed in the supporting plate 4, the lever link 22 being connected with the brake lever 1 by means of a pin 26 and the link 23 being engaged over the shaft 17 on which the roller 18 is mounted. Thus, when the lever 1 is moved rearwardly, the pair of links 22—23 will force the roller 18 along its trackway 19 until it strikes the abutment 20 at the lower end, and the pair of springs 12—13 will move past dead center, or over the pivot 5 of the lever 1, and they will then exert force in a direction to move or hold the lever 1 in brake-applying position, as shown in full lines in Fig. 3.

Through the use of a mechanism shown in either of the forms here disclosed, the safe application of the parking brake may be depended upon whenever the parking brake lever is manually set, inasmuch as the auxiliary spring means will reinforce the manual power applied, and this force will continue to be exerted until such time as the brake is manually released in the conventional manner.

It is well known that it is often difficult to apply the parking brake with sufficient force to hold a car parked on an inclined roadway or parking place, and that the parking brakes are often released accidentally due to wear of the parts of the parking brake mechanism or slight impact from adjacent vehicles, which causes the vehicle so released to coast and thus cause serious damage. The mechanism herein described thus provides a safety factor of great importance, which insures the dependable action of a parking brake even when the braking mechanism becomes worn or otherwise inoperative through the entrance of foreign matter into the mechanism.

Other modes of applying the principle of my invention may be employed instead of those explained, change being made as regards the mechanism herein disclosed, provided the means stated by any of the following claims or the equivalent thereof be employed.

I, therefore, particularly point out and distinctly claim as my invention:

1. An apparatus of the character described having in combination a supporting plate positioned vertically beneath the instrument panel of an automobile, a hand brake lever formed of a pair of spaced plates with their upper ends turned inwardly to snugly fit against the opposite sides of said supporting plate, a pivot pin connecting the upper end of said hand lever to said supporting plate, a trackway formed on the top edge of said supporting plate above said pivot pin, an arcuate rack member formed on the underside of said supporting plate beneath said pivot pin, a pawl carried by said hand lever adapted to engage said rack member, means on said hand lever for withdrawing said pawl, a pair of studs projecting outwardly at a mid-position of the length of said hand lever, a pair of coiled springs secured to said studs at one end, a shaft connecting the upper ends of said springs, a roller positioned on said shaft between said springs and adapted to be positioned on said trackway, a brake actuating cable connected to said hand lever beneath said supporting plate, whereby the movement of the hand lever rearwardly to brake-applying position will change the angular position of said springs and cause the roller automatically to move rearwardly along said trackway to assist in moving said hand lever to brake-applying position.

2. A hand brake mechanism for a brake band adapted to be contracted upon a brake drum, flexible means for connecting said brake band to a hand lever, and substantially vertical springs the lower ends of which are operatively connected to the brake lever, a floating connection for the upper ends of said springs adapted to move past dead center to brake-applying position after the lever is moved over a fraction of its path of movement toward brake-applying position.

3. A parking brake lever adapted to be moved by the operator to brake-applying position, means connected with the lever for applying the parking brake, a pair of springs anchored at one end adjacent the mid-length of the brake lever, said springs having floating connection with a roller supported on a trackway at their upper ends, whereby movement of said brake lever to brake-applying position will change the angular position of said springs to cause said springs to assist in movement of said lever in applying the parking brake.

4. An apparatus of the character described having in combination a supporting plate vertically supported beneath the instrument board of an automobile, a hand brake lever pivoted at its upper end to said supporting plate and extending downwardly for movement to brake-applying and brake-releasing position, an inclined trackway formed on the upper edge of said supporting plate, a roller mounted on said trackway and having a shaft projecting to each side thereof, a pair of substantially vertical coiled springs connected to said shaft at their upper ends and connected to said brake lever at their lower ends by means of studs extending laterally of said brake lever, a ratchet formed on the lower edge of said supporting plate and a pawl on said brake lever adapted to engage said ratchet, whereby movement of said brake lever toward brake-applying position will cause said roller to change the angular position of said coiled springs to assist in the rearward movement of said brake lever.

5. An apparatus of the character described having in combination a lever system comprising a supporting plate, a lever pivoted thereto and normally held at one end of its path of travel, a pair of springs connected at one end to said lever and normally supported at their other ends at one side of the pivot of said lever, and means responsive to the movement of said lever for shifting said other ends of said springs to the opposite side of the pivot point of said lever to supply auxiliary power to the action of the lever system in such direction.

6. A safety self-energizing replacement unit for automobile parking brake mechanism, comprising a supporting plate adapted to be secured in a vertical position beneath the instrument board of an automobile, said plate having a recessed area at the top edge thereof providing an inclined trackway, a substantially vertically extending hand brake lever formed of a pair of spaced plates pivotally mounted at its upper end on said supporting plate intermediate the opposite ends of and beneath said trackway, said plates turned inwardly to snugly fit against the opposite sides of said supporting plate, a shaft provided with a roller engaged on said trackway, a pair of substantially vertical coiled springs having their upper ends secured to the opposite ends of said shaft and having their lower ends secured to said hand lever at a point adjacent the operating end thereof, whereby movement of said hand lever in a brake-applying direction will cause movement of said roller along the trackway in a direction to apply auxiliary pressure on said hand lever and said braking mechanism.

7. An operative mechanism for a parking brake comprising a plate having a portion of its top edge cut away to provide a pair of abutting shoulders and an inclined trackway between the same, a substantially vertical brake lever pivoted at its upper end at a point intermediate the opposite ends of and below said trackway, said lever formed of metal plates parallel to each other and having their upper ends turned inwardly to engage the side surfaces of said supporting plate, a pair of vertically arranged coiled springs, a pair of outwardly projecting studs on opposite sides of said hand lever adjacent the free end thereof to provide points of attachment for the adjacent ends of said pair of coiled springs, a roller adapted to move over said trackway between said shoulders, said roller being provided with a shaft providing a point of attachment for the opposite ends of said coiled springs, an arcuate rack member formed on the under side of said supporting plate adjacent the path of movement of said hand lever, and a latching member on said hand lever, adapted to engage said rack member to hold said hand lever in brake-applying position, and means on said lever for operating said latching member.

8. In an operating mechanism for a brake, the combination of a plate provided along one edge with an arcuate ratchet and along the opposite edge of said plate with a trackway disposed on the line of an imaginary chord of said ratchet, abutments at opposite ends of said trackway, a hand lever operatively connected with the brake, pivotally mounted on said plate between said ratchet and said trackway and below the latter and between said abutments, a roller adapted to traverse said trackway, a pawl pivotally mounted on said lever and arranged to selectively engage one of the teeth of said ratchet, means on said lever for controlling the engagement of said pawl with said ratchet and its release therefrom, and spring tension means connecting the shaft for said roller with the outer end portion of said lever for normally maintaining said roller in engagement with one of said abutments, when said lever is in brake release position, and arranged to change the angular position of said tension means and move said roller along said trackway into engagement with the other abutment when said lever is operated in the brake applying direction.

9. A mechanism as claimed in claim 8 wherein is provided between said lever and said roller a linkage arranged to be operated by said lever to move said roller in either direction on said trackway dependent on the direction of movement of said lever.

10. In mechanism for setting and releasing a brake, the combination of a plate having on its upper edge, a substantially horizontal trackway provided at its opposite ends with abutments, a shaft provided with a roller arranged to traverse said trackway and engage one of said abutments when the brake is released and to engage the other abutment in the movement of the brake toward its set position, a pair of substantially vertical coiled springs connected at their upper ends to the opposite ends of said shaft, a member operatively connected with the brake and pivotally mounted at its upper end on said plate below said trackway and intermediate said abutments, the opposite ends of said springs being connected to the outer end portion of said member and normally tending to maintain said member in one position and said roller in engagement with one of said abutments when the brake is in released position, said member being adapted to be manually operated about its pivot to its other position to swing said springs past the pivot for said member and move said roller into engagement with the other abutment, whereby auxiliary pressure is applied to the brake in its set position.

FRANK P. BOWER.

REFERENCES CITED

The following references are of record in the file of this patent:

UNITED STATES PATENTS

| Number | Name | Date |
|---|---|---|
| 1,557,353 | Frank | Oct. 13, 1925 |
| 1,717,383 | James | June 18, 1929 |
| 1,945,070 | Pooley | Jan. 30, 1934 |
| 2,161,334 | Carwardine | June 6, 1939 |
| 2,243,937 | Almond | June 3, 1941 |